(12) United States Patent
Alhasson

(10) Patent No.: US 12,386,051 B2
(45) Date of Patent: Aug. 12, 2025

(54) DUAL POLARIZATION RADAR

(71) Applicant: NXP B.V., Eindhoven (NL)

(72) Inventor: Saif Alhasson, Munich (DE)

(73) Assignee: NXP B.V., Eindhoven (NL)

( * ) Notice: Subject to any disclaimer, the term of this patent is extended or adjusted under 35 U.S.C. 154(b) by 437 days.

(21) Appl. No.: 18/059,770

(22) Filed: Nov. 29, 2022

(65) Prior Publication Data
US 2024/0176007 A1    May 30, 2024

(51) Int. Cl.
    *G01S 13/42*    (2006.01)
    *G01S 7/03*    (2006.01)

(52) U.S. Cl.
    CPC ............ *G01S 13/422* (2013.01); *G01S 7/032* (2013.01)

(58) Field of Classification Search
    CPC ........ G01S 13/42; G01S 13/422; G01S 7/032; G01S 7/024; G01S 7/025
    See application file for complete search history.

(56) References Cited

U.S. PATENT DOCUMENTS

| | | | |
|---|---|---|---|
| 3,453,617 A | 7/1969 | Begeman | |
| 6,140,963 A | 10/2000 | Azzarelli | |
| 6,839,037 B1 | 1/2005 | Stokes | |
| 7,746,267 B2 | 6/2010 | Raney | |
| 9,434,203 B2 * | 9/2016 | Lefebvre | B42D 25/29 |
| 2016/0025839 A1 | 1/2016 | Trummer | |
| 2019/0041493 A1 * | 2/2019 | Greenberg | G01S 7/026 |
| 2021/0255301 A1 * | 8/2021 | Campbell | G01S 13/284 |

FOREIGN PATENT DOCUMENTS

| | | | | |
|---|---|---|---|---|
| GB | 2265513 A | | 9/1993 | |
| GB | 2421386 A | | 6/2006 | |
| KR | 20240019636 A | * | 2/2024 | ............ G01S 7/354 |
| WO | 2017013658 A1 | | 1/2017 | |

OTHER PUBLICATIONS

U.S. Appl. No. 17/724,102 ('102 Application) filed Apr. 19, 2022.

* cited by examiner

*Primary Examiner* — Vladimir Magloire
*Assistant Examiner* — Peter Davon Doze

(57) ABSTRACT

Various embodiments relate to a radar system, including: a transmitter; a transmit antenna connected to the transmitter, wherein the transmit antenna is a circular polarized antenna; a receiver; a receive antenna connected to the receiver, wherein the receive antenna is a dual polarization antenna having a main lobe and ambiguity sidelobes; wherein the radar system is configured to: transmit a first and second radar signal with first and second circular polarizations in first and second modes; receive reflected first and second radar signals; process the received first and second radar signals to detect a target and to produce first and second mode target powers; comparing the first mode target power to the second mode target power to determine which lobe of the antenna in which the target is located.

20 Claims, 9 Drawing Sheets

DUAL POLARIZATION RADAR

TECHNICAL FIELD

Various exemplary embodiments disclosed herein relate generally to combining dual polarization with reconfigurable circular polarization for ambiguity removal and field of view shaping for a high resolution radar.

BACKGROUND

Radar systems and communication systems send and receive radio signals via transmitting and receiving antennas. Various types of antennas may be used in such systems. The transmitting and receiving antennas may have a linear or circular polarization depending upon the use case of the system.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a radar system, including: a transmitter; a transmit antenna connected to the transmitter, wherein the transmit antenna is a circular polarized antenna; a receiver; a receive antenna connected to the receiver, wherein the receive antenna is a dual polarization antenna having a main lobe and an ambiguity sidelobe, wherein the ambiguity sidelobe is one of a lower ambiguity sidelobe, and an upper ambiguity sidelobe; a processor; a memory storing instruction, that when executed by the processor, cause the radar system at least to: transmit a first radar signal with a first circular polarization in a first mode; receive a reflected first radar signal; process the received first radar signal to detect a target and to produce a first mode target power; transmit a second radar signal with a second circular polarization in a second mode; receive a reflected second radar signal; process the received second radar signal to detect the target and to produce a second mode target power; comparing the first mode target power to the second mode target power; determining that the target is in the main lobe when the first mode target power and the second mode target power are substantially equal; determining that the target is in the upper ambiguity sidelobe when the when the power in the first mode is higher than the power in second mode; and determining that the target is in the lower ambiguity sidelobe when the when the power in the first mode is lower than the power in second mode.

Various embodiments are described, wherein the transmit antenna is a patch antenna with differential feed inputs and a configurable phase shifter configured to shift the phase of one of the differential feed inputs.

Various embodiments are described, wherein the transmit antenna is a configurable circular polarized horn antenna.

Various embodiments are described, wherein the receive antenna is a dual polarized slotted waveguide antenna.

Various embodiments are described, wherein the dual polarized slotted waveguide is a series fed antenna.

Various embodiments are described, wherein processing the received first radar signal to detect a target and to produce a first mode target power includes processing received intermediate frequency (IF) signal samples of the first radar signal using a two-dimensional fast Fourier transform (2D FFT) to produce a first range-Doppler map; and processing the received second radar signal to detect a target and to produce a second mode target power includes processing received IF signal samples of the second radar signal using a two-dimensional fast Fourier transform (2D FFT) to produce a second range-Doppler map.

Various embodiments are described, wherein comparing the first mode target power to the second mode target power is performed for each target found in the first range-Doppler map and the second range-Doppler map.

Various embodiments are described, wherein the first circular polarization mode is one of a right hand circular polarization and a left hand circular polarization, wherein the second circular polarization a left hand circular polarization when the first polarization is a right hand circular polarization, and wherein the second circular polarization a right hand circular polarization when the first polarization is a left hand circular polarization.

Various embodiments are described, wherein the memory includes instructions to cause the radar system to: transmit a third radar signal with no circular polarization in a third mode; receive a reflected third radar signal; and process the received third radar signal to detect a target and to produce a third mode target power, wherein the third mode target power is used to verify in which lobe the target is located.

Further various embodiments relate to a radar system, including: a transmitter; a transmit antenna connected to the transmitter, wherein the transmit antenna is a dual polarization antenna having a main lobe and an ambiguity sidelobe, wherein the ambiguity sidelobe is one of a lower ambiguity sidelobe, and an upper ambiguity sidelobe; a receiver; a receive antenna connected to the receiver, wherein the receive antenna is a reconfigurable circular polarized antenna; a processor; a memory storing instruction, that when executed by the processor, cause the radar system at least to: transmit a first radar signal; receive a reflected first radar signal with a first circular polarization in a first mode; process the received first radar signal to detect a target and to produce a first mode target power; transmit a second radar signal; receive a reflected second radar signal with a second circular polarization in a second mode; process the received second radar signal to detect the target and to produce a second mode target power; comparing the first mode target power to the second mode target power; determining that the target is in the main lobe when the first mode target power and the second mode target power are substantially equal; determining that the target is in the upper ambiguity sidelobe when the when the power in the first mode is higher than the power in second mode; and determining that the target is in the lower ambiguity sidelobe when the when the power in the first mode is lower than the power in second mode.

Various embodiments are described, wherein the receive antenna is a patch antenna with differential feed inputs and a configurable phase shifter configured to shift the phase of one of the differential feed inputs.

Various embodiments are described, wherein the receive antenna is a configurable circular polarized horn antenna.

Various embodiments are described, wherein the transmit antenna is a dual polarized slotted waveguide antenna.

Various embodiments are described, wherein the dual polarized slotted waveguide is a series fed antenna.

Various embodiments are described, wherein processing the received first radar signal to detect a target and to produce a first mode target power includes processing received intermediate frequency (IF) signal samples of the first radar signal using a two-dimensional fast Fourier transform (2D FFT) to produce a first range-Doppler map; and processing the received second radar signal to detect a target and to produce a second mode target power includes processing received IF signal samples of the second radar signal using a two-dimensional fast Fourier transform (2D FFT) to produce a second range-Doppler map.

Various embodiments are described, wherein comparing the first mode target power to the second mode target power is performed for each target found in the first range-Doppler map and the second range-Doppler map.

Various embodiments are described, wherein the first circular polarization mode is one of a right hand circular polarization and a left hand circular polarization, wherein the second circular polarization a left hand circular polarization when the first polarization is a right hand circular polarization, and wherein the second circular polarization a right hand circular polarization when the first polarization is a left hand circular polarization.

Various embodiments are described, wherein the memory includes instructions to cause the radar system to: transmit a third radar signal with no circular polarization in a third mode; receive a reflected third radar signal; and process the received third radar signal to detect a target and to produce a third mode target power, wherein the third mode target power is used to verify in which lobe the target is located.

Further various embodiments relate to a radar system, comprising: a transmitter; a transmit antenna connected to the transmitter, wherein the transmit antenna is a reconfigurable circular polarized antenna; a receiver; a receive antenna connected to the receiver, wherein the receive antenna is a dual polarization antenna having a main lobe and an ambiguity sidelobe, wherein the ambiguity sidelobe is one of a lower ambiguity sidelobe, and an upper ambiguity sidelobe; a processor; a memory storing instruction, that when executed by the processor, cause the radar system at least to: transmit a first radar signal with a first circular polarization in a first mode; receive a reflected first radar signal; transmit a second radar signal with a second circular polarization in a second mode; and receive a reflected second radar signal; wherein a field of view of the radar system in the first mode is different from the field of view in the second mode.

Further various embodiments relate to a radar system, including: a transmitter; a transmit antenna connected to the transmitter, wherein the transmit antenna is a dual polarization antenna having a main lobe an ambiguity sidelobe, wherein the ambiguity sidelobe is one of a lower ambiguity sidelobe, and an upper ambiguity sidelobe; a receiver; a receive antenna connected to the receiver, wherein the receive antenna is a reconfigurable circular polarized antenna; a processor; a memory storing instruction, that when executed by the processor, cause the radar system at least to: transmit a first radar signal with a first circular polarization in a first mode; receive a reflected first radar signal; transmit a second radar signal with a second circular polarization in a second mode; and receive a reflected second radar signal; wherein a field of view of the radar system in the first mode is different from the field of view in the second mode.

BRIEF DESCRIPTION OF THE DRAWINGS

In order to better understand various exemplary embodiments, reference is made to the accompanying drawings as listed below.

FIG. 4 illustrates a parallel fed dual polarized slotted waveguide antenna.

To facilitate understanding, identical reference numerals have been used to designate elements having substantially the same or similar structure and/or substantially the same or similar function.

DETAILED DESCRIPTION

Figure 1:
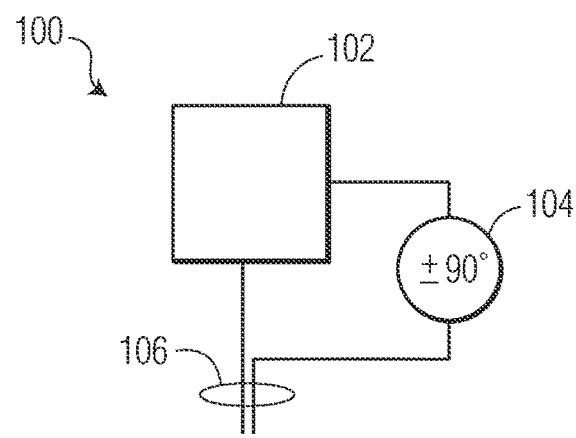
FIG. 1 illustrates an example of a patch circular polarized antenna.

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Radars are being used in vehicle applications to detect nearby vehicles, pedestrians, stationary objects, etc. The radar transmits a waveform that is reflected back to the radar from various objects in the radar's field of view (FOV). The radar may steer the beam if desired to scan an angular volume. The radar processes the received signal to determine the range to the objects reflecting the signal back to the radar as well as the relative velocity between the radar and the detected objects. This may be done by transmitting a frequency-modulated continuous-wave (FMCW) signal, and then applying a two-dimensional fast Fourier transform (2D-FFT) on the received signal. This processing allows for range to be resolved as well and the relative velocity between the radar and objects based upon the doppler shift on the received signal. Other types of radar waveforms and their associated processing may also be used. The combination of signal processing and antenna parameters allow for the radar to achieve a high resolution. The radar design trades off cost, volume, weight, power consumption, etc. versus performance. This sort of radar may be used in other applications as well.

The radar may include a transmitter that is connected to a transmit antenna. The transmitter generates the radar signal and the transmit antenna radiates the signal into free space. The radar may also include a receiver that is connected to a receive antenna. The receive antenna receives the reflected radar signal and provides that signal to the receiver. The receiver then processes the signal to detect targets. In some application, the transmit and receive antennas may be implemented as a single antenna. This may be driven by various design and performance parameters of the radar system.

The angular resolution of the radar depends upon the aperture size of the radar antenna. A larger aperture leads to a narrower beam. Also, the antenna may have sidelobes that may cause ambiguities in detecting targets. So, one challenge for a high resolution radar is target ambiguity.

Embodiments of a radar system will be described herein that use polarization schemes to reduce the target ambiguity of the radar as well as being able to adjust the FOV of the radar. Also in communication settings, the methods described herein may allow for adaptive coverage regions.

The radar method and system described herein may include the following features. A combination of circular polarization and dual polarization will be used for ambiguity removal. A combination of circular polarization and dual polarization will be used for a reconfigurable radar (or communication system) FOV. The circular and dual polarization are interchangeable between a receiving and transmitting antenna which provides flexibility for the hardware required for reconfigurable circular polarization (i.e., it may be on the receive or transmit side). The radar may use two different feeding methods, that is serial and parallel, which provide flexibility in the transmitter and receiver design. A reconfigurable circular polarization antenna may be used that may generate left handed and right handed polarization. Also, dual polarized antennas that have alternating polarization elements may be used. The ambiguity removal functionality may be applied to one plane (e.g., azimuth or elevation) which allows for increasing the number of elements in the other plane to increase gain and focus the antenna pattern. The methods described herein may be applied to both radar and communication systems.

The radar may include one or more transmit antennas and one or more receive antennas. One antenna(s) is a circular polarized antenna, and the other antenna is a dual polarized antenna. That is, if the transmitter has a dual polarized antenna, then the receiver should have circular polarization antenna and vice versa. For explanatory reasons it will be assumed in the description herein that the transmitter has circular polarized antenna and the receiver dual polarized antenna, but the reverse could be true as well.

Figure 2:
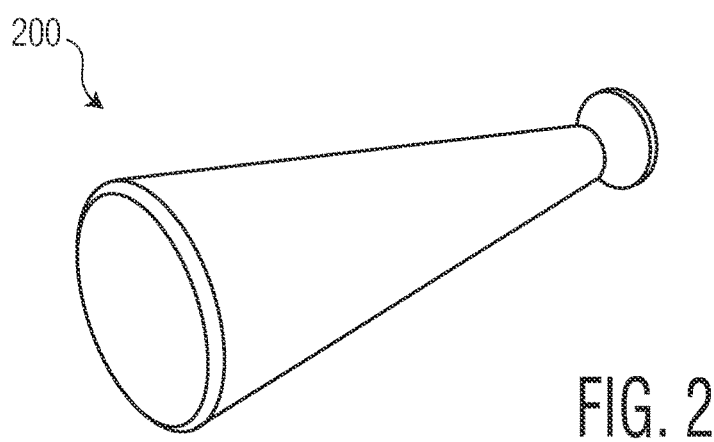
FIG. 2 illustrates an example of a horn circular polarized antenna.

The transmit antenna will be a circular polarized antenna that is capable of generating a left handed circular polarization (LHCP) and right handed circular polarization (RHCP) and switching between those two modes at will. This may be achieved if, for example, the lines of the differential output of the RF chip are used to excite orthogonal modes in the antenna or a launcher that is used to excite that antenna. FIGS. 1 and 2 provide examples of circular polarized antennas that may be used by the radar.

Figure 3:
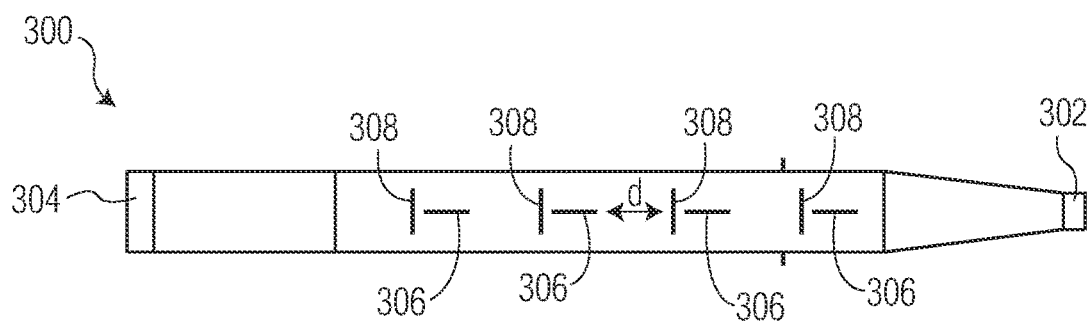
FIGS. 3-5 provide examples of dual polarized antennas that may be used by the radar.
Figure 4:
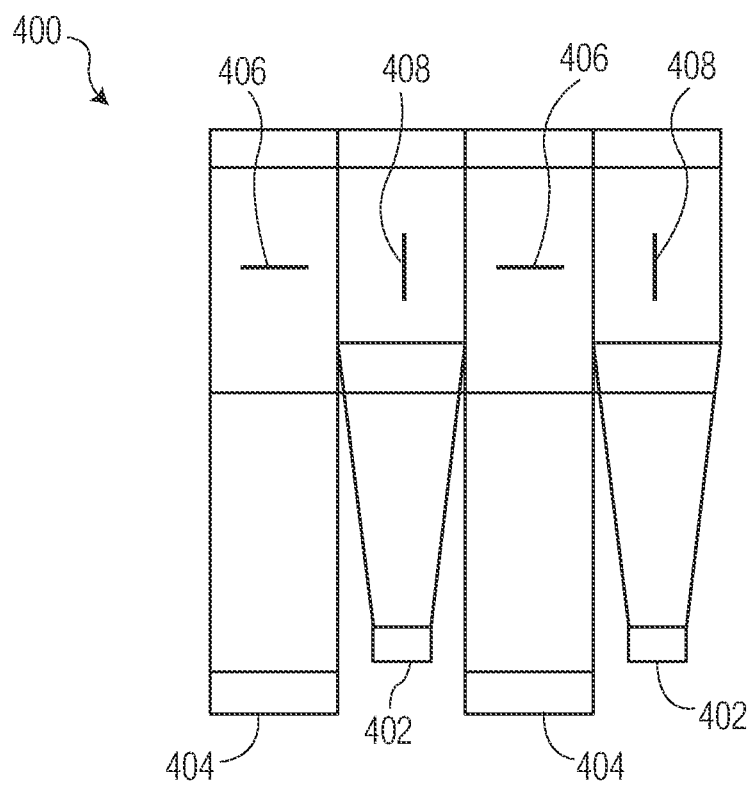
Figure 5:
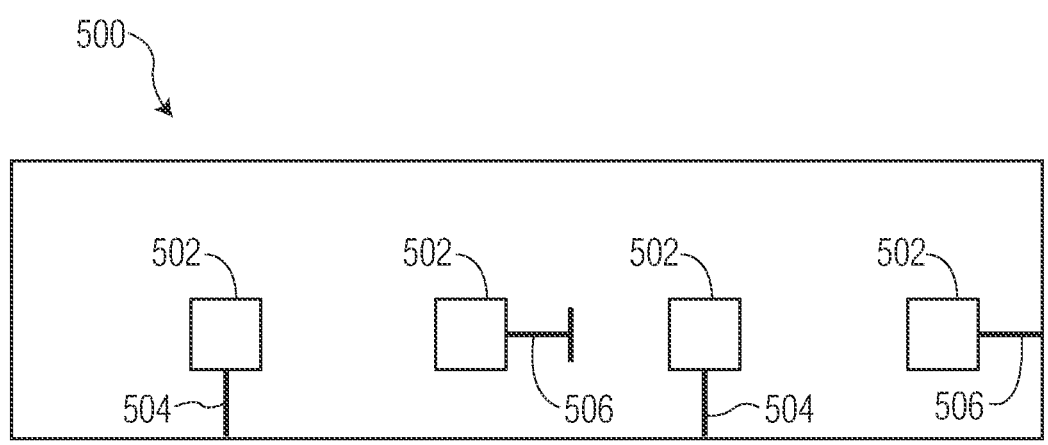

The receive antenna is a dual polarized antenna that includes alternating horizontal and vertical polarization radiating elements. The radiating elements may be fed either in series or in parallel. Each feeding method has different applications. FIGS. 3-5 provide examples of dual polarized antennas that may be used by the radar.

FIG. 1 illustrates an example of a patch circular polarized antenna. The patch circular polarized antenna 100 includes a radiating patch 102 which may be a metallic or conductive layer on a substrate. In this case the radiating patch 102 is shown as square but the radiating patch 102 may have other shapes as well. The signal to be transmitted is received on differential input lines 106. A phase shifter 104 is placed along one of the differential input lines 106. The phase shifter 104 places a ±90° on one of the differential input lines. By alternating between a −90° and a +90° phase shift, left handed circular polarization and right handed circular polarization may be achieved. Each of the differential input lines 106 are attached to different orthogonal sides of the of the of the radiating patch 102 to create a circular polarized antenna. In other embodiments of a circular polarized antenna, multiple radiating patches 102 may be used in either a line or a grid. This would provide additional gain for the antenna while narrowing the antenna beamwidth.

FIG. 2 illustrates an example of a horn circular polarized antenna. The horn circular polarized antenna 200 may provide higher gain than a patch antenna. The structure of the feed and the horn of the horn circular polarized antenna 200 results in a circularly polarized antenna. A circular waveguide launcher may be used to also achieve alternating between left handed circular polarization and right handed circular polarization. Other configurable circularly polarized antennas may be used in the embodiments described herein. In other embodiments of a circular polarized antenna, multiple horn circular polarized antenna 200 may be used in either a line or a grid. This would provide additional gain for the antenna while narrowing the antenna beamwidth.

FIG. 3 illustrates a series fed dual polarized slotted waveguide antenna 300. The series fed dual polarized slotted waveguide antenna 300 includes alternating horizontal waveguide slots 306 and vertical waveguide slots 308. The horizontal waveguide slots 306 transmit/receive vertically polarized signals, and the vertical waveguide slots 308 transmit/receive horizontally polarized signals. The series fed dual polarized slotted waveguide antenna 300 has a first serial input feed 302 at one end that tapers as shown. The series fed dual polarized slotted waveguide antenna 300 has a second serial input feed 304 that tapers in a direction orthogonal to the taper of first serial input feed 302. The first serial input feed 302 and second serial input feed 304 receive different signals that have orthogonal polarizations. Accordingly, one of the input feeds the horizontal waveguide slots 306 and the other input feed feeds the vertical waveguide slots 308. In the series fed dual polarized slotted waveguide antenna 300 the closest horizontally and vertically polarized elements are a quarter wavelength apart as denoted by the distance d in FIG. 2, but the distance d may take on other values as well. This series fed dual polarized slotted waveguide antenna 300 may have target ambiguities because the distance between its (similar polarization) elements is larger than half wavelength. In other embodiments of a series fed dual polarized slotted waveguide antenna, additional horizontal waveguide slots 306 and vertical waveguide slots 308 may be used. Also, any number of additional series fed dual polarized slotted waveguide antennas 300 could be stacked vertically (as oriented in FIG. 3). This would provide additional gain for the antenna while narrowing the antenna beamwidth.

FIG. 4 illustrates a parallel fed dual polarized slotted waveguide antenna 400. The parallel fed dual polarized slotted waveguide antenna 400 includes alternating horizontal waveguide slots 406 and vertical waveguide slots 408. The horizontal waveguide slots 406 transmit/receive vertically polarized signals, and the vertical waveguide slots 408 transmit/receive horizontally polarized signals. The parallel fed dual polarized slotted waveguide antenna 400 has a first parallel input feeds 402 that taper as shown. The parallel fed dual polarized slotted waveguide antenna 400 has a second parallel input feeds 404 that taper in a direction orthogonal to the taper of first parallel input feeds 402. The first parallel input feeds 402 and second parallel input feeds 404 receive different signals that have orthogonal polarizations. Accordingly, one set of the parallel input feeds the horizontal waveguide slots 406 and the other parallel input feed feeds the vertical waveguide slots 408. In other embodiments of a parallel fed dual polarized slotted waveguide antenna, more horizontal waveguide slots 406 and vertical waveguide slots 408 may be used. Also, additional horizontal waveguide slots 406 and vertical waveguide slots 408 may be added in the vertical direction of FIG. 4. This would provide additional gain for the antenna while narrowing the antenna beamwidth.

FIG. 5 illustrates an embodiment of parallel fed dual polarized patch antenna 500. The parallel fed dual polarized patch antenna 500 includes radiating patches 502, first parallel feeds 504, and second parallel feeds 506. The first parallel feeds 504 attach to the radiating patch 502 on a first side to provide a first polarization. The second parallel feeds 506 attach to the radiating patch 502 on a second side orthogonal to the first side to provide a second polarization. The first and second polarizations are orthogonal to one another. In other embodiments of a parallel fed dual polarized patch antenna, multiple additional radiating patches 502 may be used in either a line or a grid. This would provide additional gain for the antenna while narrowing the antenna beamwidth.

In another embodiment, a single antenna may be able to operate in a linear polarization mode and a circular polarization mode. For example, a radiating patch may include various connections that allow for transmitting/receiving linear or circular polarized signals depending on which connections are used and if a phase shift is applied to any of the inputs. This would allow for the same antenna to be used in transmit and receive where a different polarization mode used for transmit and receive.

As described above, to design a radar with a high angular resolution, a large antenna aperture may be used because the beamwidth of the antenna is inversely proportional to the antenna length. Using such an antenna requires more space which means larger radar size and fabrication costs. Furthermore, combining high resolution with large gain values for certain types of antennas (such as slotted waveguides antennas by placing the slots where the current is maximum) is possible but results in angular ambiguities due to physical limitations related to the current distribution. Combing such dual polarization functionality with compactness and highest possible gain in an antenna was described in U.S. patent application Ser. No. 17/724,102 ('102 application) filed on Apr. 19, 2022, which is hereby incorporated by reference herein for all purposes. This antenna results in angular ambiguity. The embodiments described herein combine dual polarity with reconfigurable circular polarity to remove the ambiguities and achieve high angular resolution for high gain compact dual polarized receiver.

Figure 6:
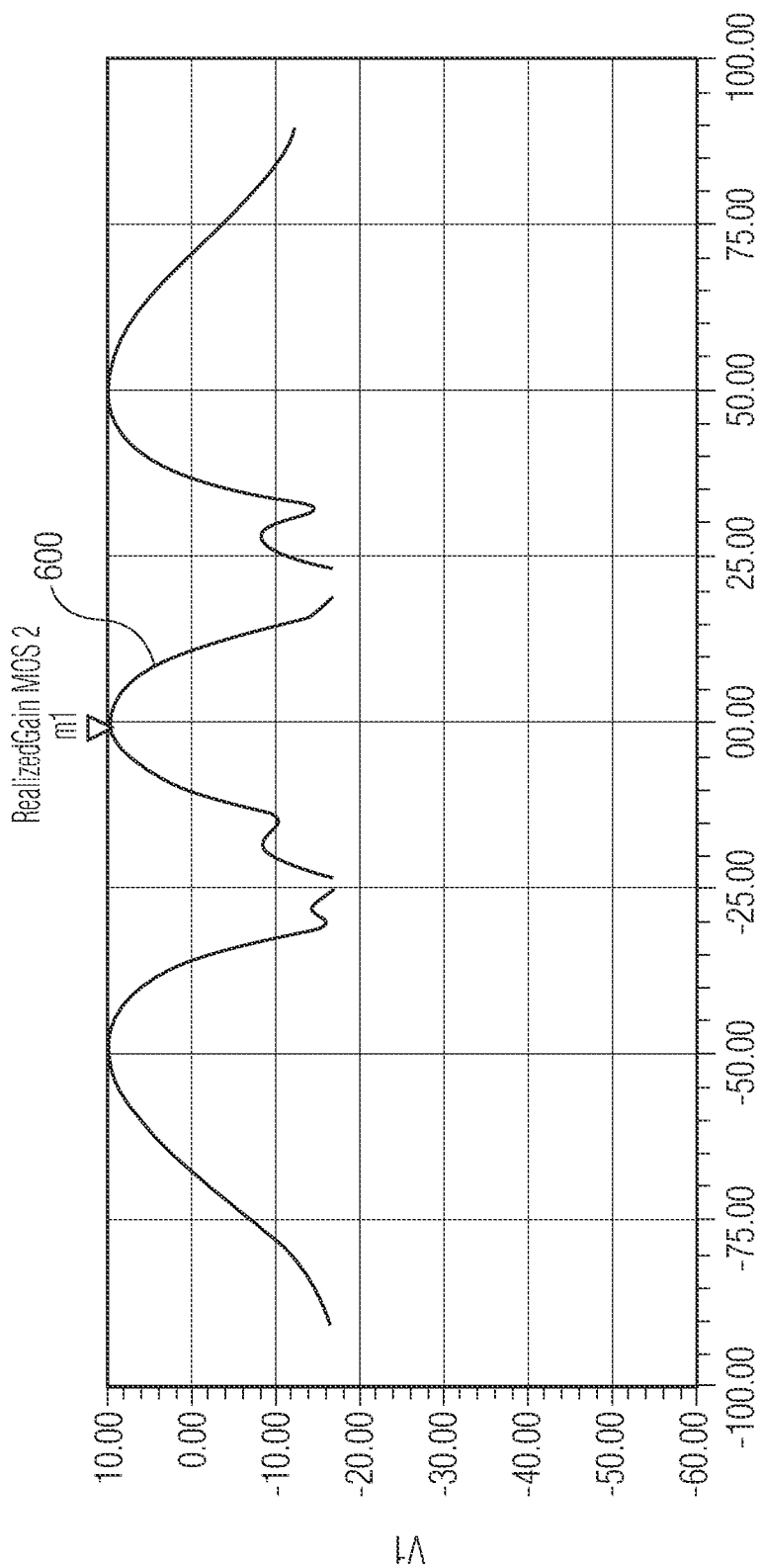
FIG. 6 illustrates a plot of receive antenna gain versus angle for the series fed dual polarized slotted waveguide antenna of FIG. 3.

FIG. 6 illustrates a plot of receive antenna gain versus angle for the series fed dual polarized slotted waveguide antenna 300 of FIG. 3. This receive antenna is an example that can be used to explain the function of removal of ambiguity, but this function applies to any dual polarized antenna with the same distance between the radiating elements. This antenna is described in further detail in the '102 application. The gain plot 600 includes three lobes: a main lobe at 0° and two ambiguity sidelobes to the left and to the right at +50° with a gain similar to the main lob. Those two additional sidelobes will generate ambiguities in the detection of targets because a target at 0° or at +50° will all produce a signal of the same amplitude, and it cannot be determined at which angle the target is located.

Figure 7:
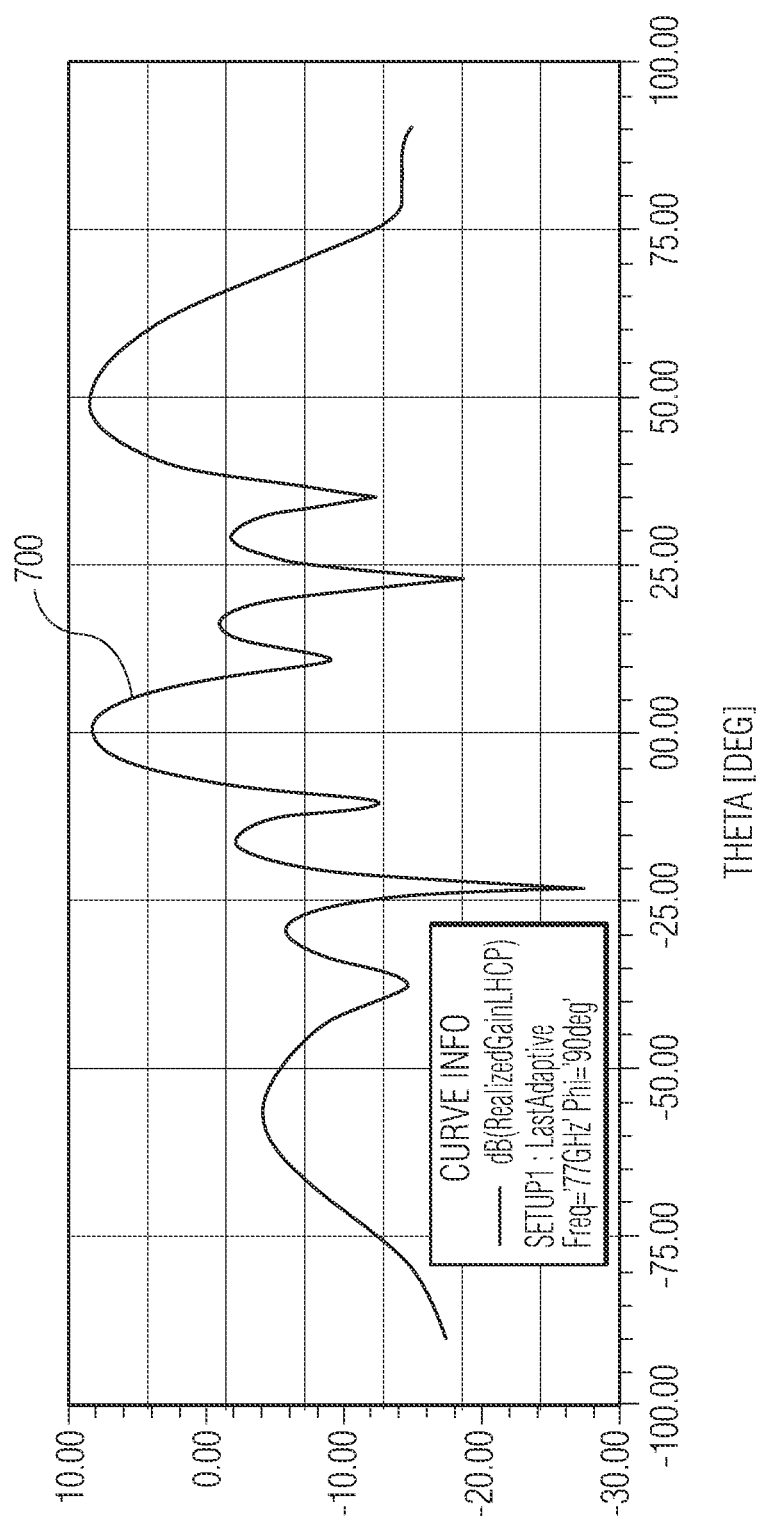
FIG. 7 illustrates a plot of the receive antenna gain for a dual polarized antenna receiving a LHCP signal.
Figure 8:
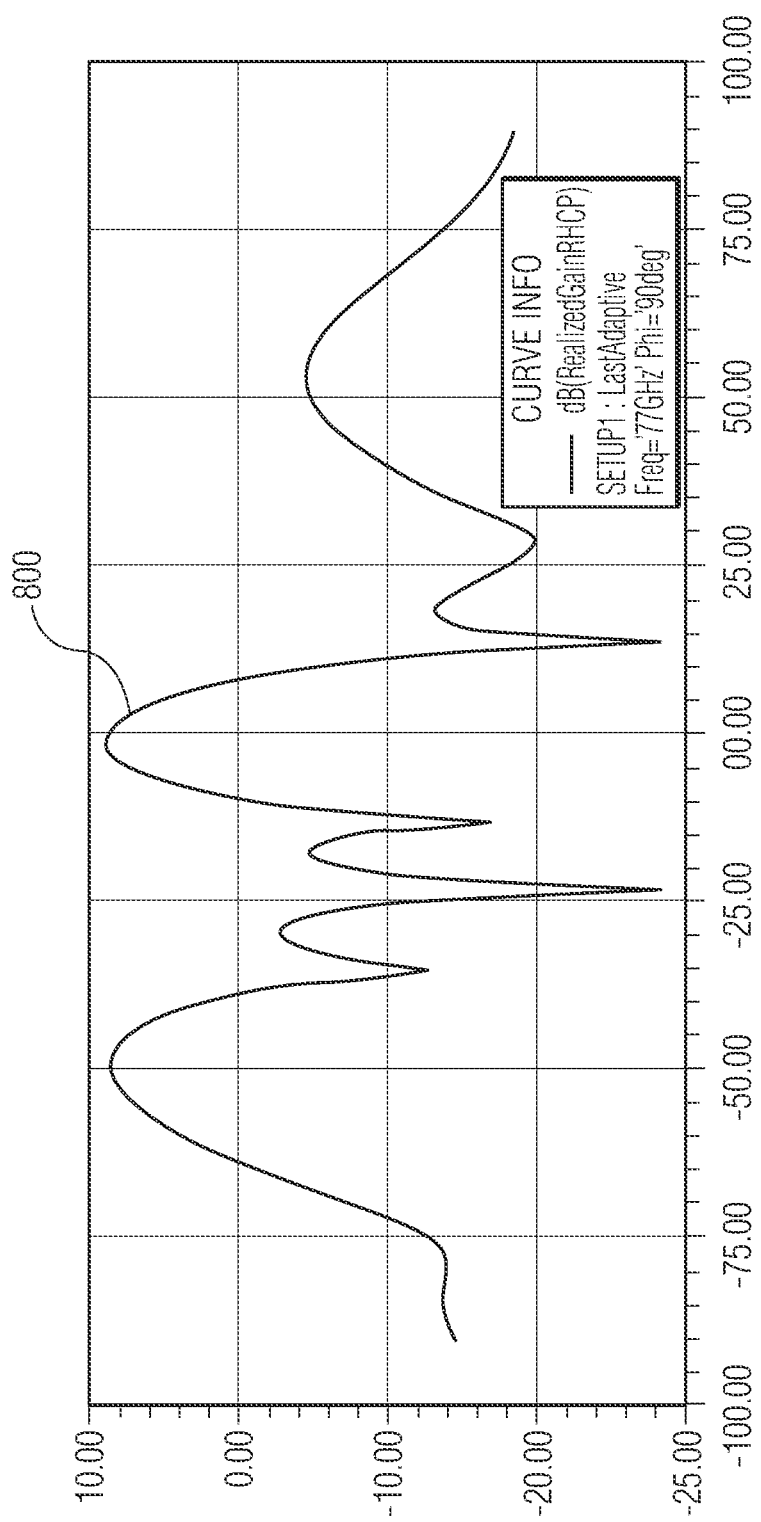
FIG. 8 illustrates a plot of the receive antenna gain for a dual polarized antenna receiving a RHCP signal.
Figure 9:
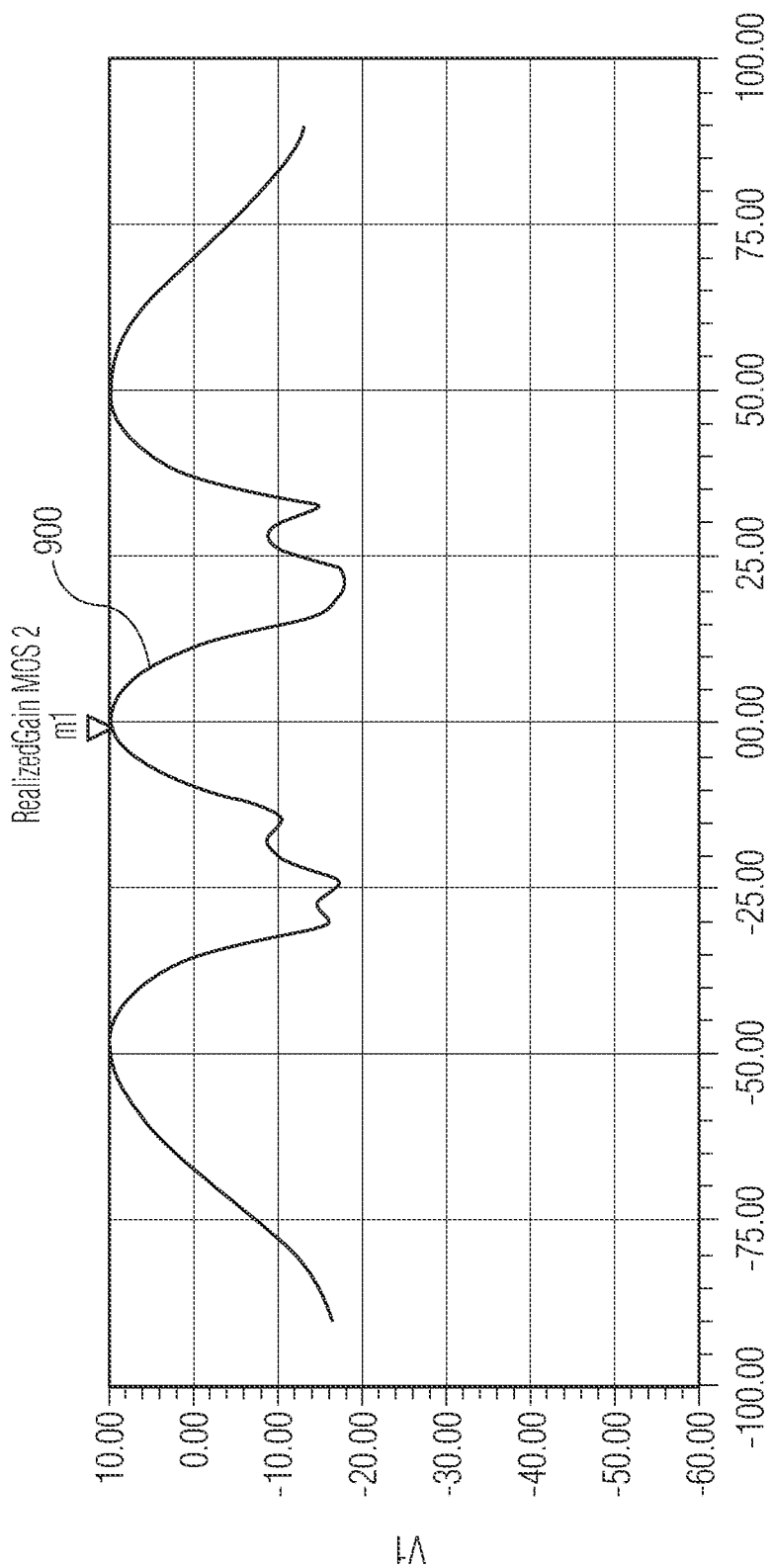
FIG. 9 illustrates a plot of the receive antenna gain for a dual polarized antenna receiving a signal with no circular polarization, which plot is like the plot of FIG. 6.

Now instead of using a dual polarized transmitter, a reconfigurable circular polarized transmitter may be used with the antenna illustrated in FIGS. 1 and 2. A first mode of the transmitter may be achieved by introducing a phase shift of −90° between the RF differential lines and hence the transmitter may generate a LHCP signal. FIG. 7 illustrates a plot of the receive antenna gain for a dual polarized antenna receiving a LHCP signal. The gain plot 700 includes a main lobe at 0° and ambiguity sidelobes at +50°. A second mode of the transmitter may be achieved by introducing a phase shift of +90° between the RF differential lines and hence the transmitter may generate a RHCP signal. FIG. 8 illustrates a plot of the receive antenna gain for a dual polarized antenna receiving a RHCP signal. The gain plot 800 includes a main lobe at 0° and an ambiguity sidelobe at −50°. An optional third mode of the transmitter may be achieved by using no phase shift (i.e., a phase shift of 0°) between the RF differential lines and hence the transmitter may radiate a dual polarized signal by radiating in both the horizontal plane and the vertical plane. FIG. 9 illustrates a plot of the receive antenna gain for a dual polarized antenna receiving a signal with no circular polarization, which plot is like the plot of FIG. 6. The gain plot 900 includes a main lobe at 0° and an ambiguity sidelobes at +50°.

The radar system may alternate between the first transmit mode and the second transmit mode to determine if a detected target is in the main lobe or one of the ambiguity sidelobes. The received signal power for a potential target (i.e., a target that has been resolved in range and doppler) received in the first and second modes are compared. If the received signal power is substantially equal, e.g., to within some threshold value, then the target is in the main lobe. For example, a ratio of the signal power from the first and second mode may be computed, and when the ratio is above a main lobe threshold then the target is in the main lobe.

If received power in the first mode is higher than the received power in the second mode, then the target is in the +50° ambiguity sidelobe. This can be seen by noting that in FIG. 7 the +50° ambiguity sidelobe has a gain about the same as the gain of the main lobe, and in FIG. 8 the +50° ambiguity sidelobe has a gain much less than the gain of the main lobe. This leads to the conclusion that the target is in the +50° ambiguity sidelobe. This decision may be may also be made by taking the ratio of the received power in the first mode and the second mode and comparing it to a sidelobe threshold.

If received power in the first mode is lower than the received power in the second mode, then the target is in the −50° ambiguity sidelobe. This can be seen by noting that in FIG. 8 the −50° ambiguity sidelobe has a gain about the same as the gain of the main lobe, and in FIG. 7 the −50° ambiguity sidelobe has a gain much less than the gain of the main lobe. This leads to the conclusion that the target is in the −50° ambiguity sidelobe. This decision may also be made as described above by taking the ratio of the received power in the first mode and the second mode and comparing it to a sidelobe threshold.

As a result, by alternating the transmit signal between LHCP and RHCP and then comparing the target received power, the radar system may determine whether the detected target is in the main lobe, a lower ambiguity sidelobe, or an upper ambiguity sidelobe.

In an alternative embodiment, the radar may also transmit a signal using the third mode. The resulting target receive power may be used to verify the check based upon the first two modes using the target receive power from the third mode. If the first two modes indicate that the target is in the upper ambiguity sidelobe at +50°, then the received power from the third mode should be about the same within a threshold value of the received target value from the first mode. If so, then it is verified that the target is in the upper ambiguity sidelobe. Further, if the first two modes indicate that the target is in the lower ambiguity sidelobe at −50°, then the received power from the third mode should be about the same within a threshold value of the received target value from the second mode. If so, then it is verified that the target is in the lower ambiguity sidelobe. Also, if the first two modes indicate that the target is in the main lobe at 0°, then the received power from the third mode should be about the same within a threshold value of the received target value from the first mode and second mode. If so, then it is verified that the target is in the main lobe.

Figure 10:
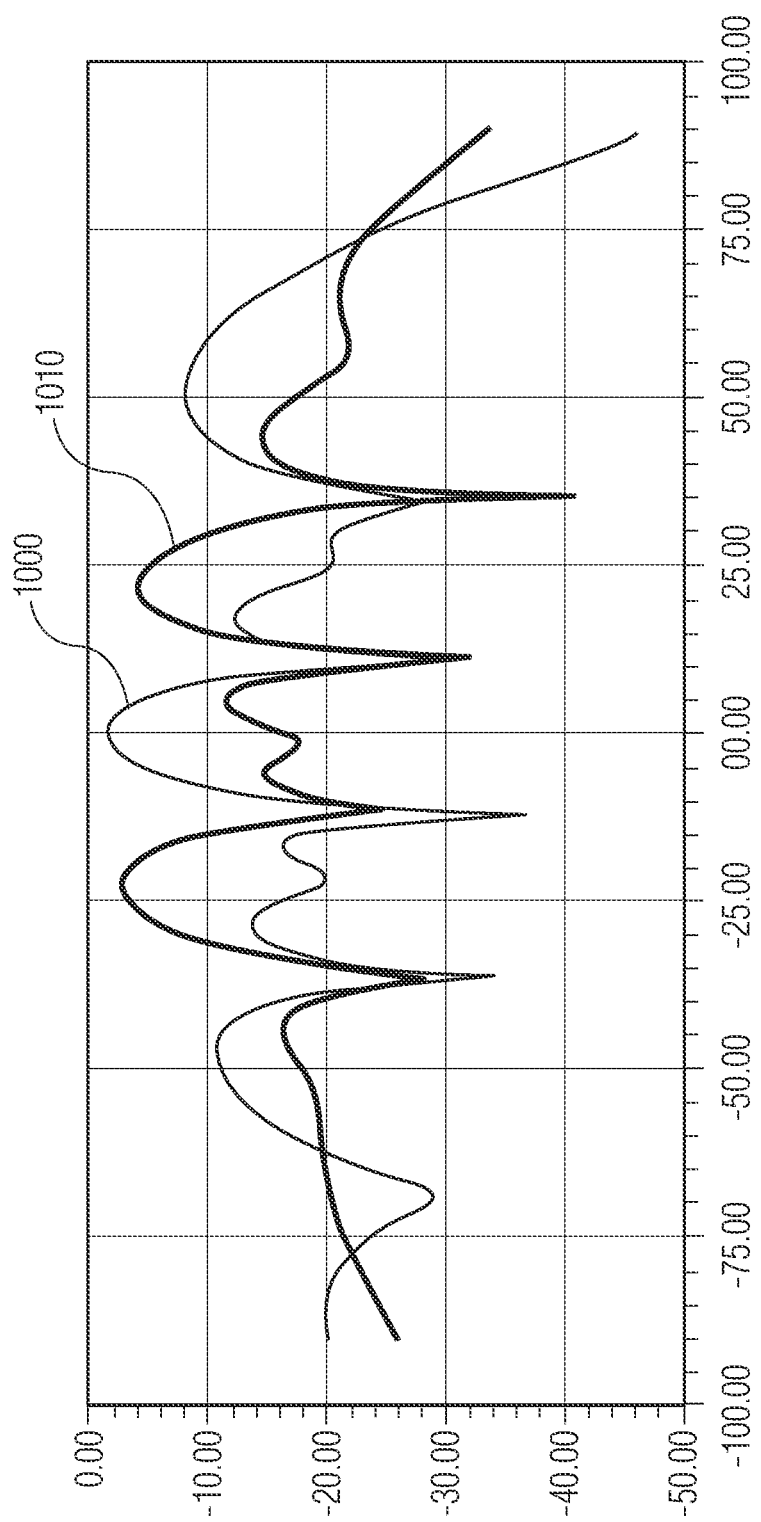
FIG. 10 illustrates a plot of the receive antenna gain for a dual polarized antenna receiving a RHCP signal and a LHCP signal.

The use of a dual polarized receive antenna with reconfigurable circular polarized transmit antenna may be used to change or shape the field of view. FIGS. 7 and 8 illustrate one way in which the field of view may be shaped. In FIG. 7 the lower ambiguity sidelobe is suppressed, and in FIG. 8 the upper ambiguity sidelobe is suppressed. This is accomplished using the series fed dual polarized slotted waveguide antenna 300. If the parallel fed dual polarized slotted waveguide antenna 400 or the parallel fed dual polarized patch antenna 500 are used, then the field of view may be shaped in other ways. FIG. 10 illustrates a plot of the receive antenna gain for a dual polarized antenna receiving a RHCP signal and a LHCP signal. The plot 1000 results from LHCP at the transmitter, and the plot 1010 results from RHCP at the transmitter. As a result, the field of view may be shaped as in plot 1010 where there are two lobes at +25° by transmitting with RHCP. If the LHCP transmission is used, then the field of view may have lobes at 0° and +50°. Thus, the field of view may be shaped by selecting the transmit circular polarization.

It is worth mentioning that overlapping between the main lobes of both LHCP and RHCP which is illustrated in FIGS. 7, 8, and 9 (and which is missing in the FIG. 10), is the function which made the series feed configuration more suitable for ambiguity removal functionality.

Figure 11:
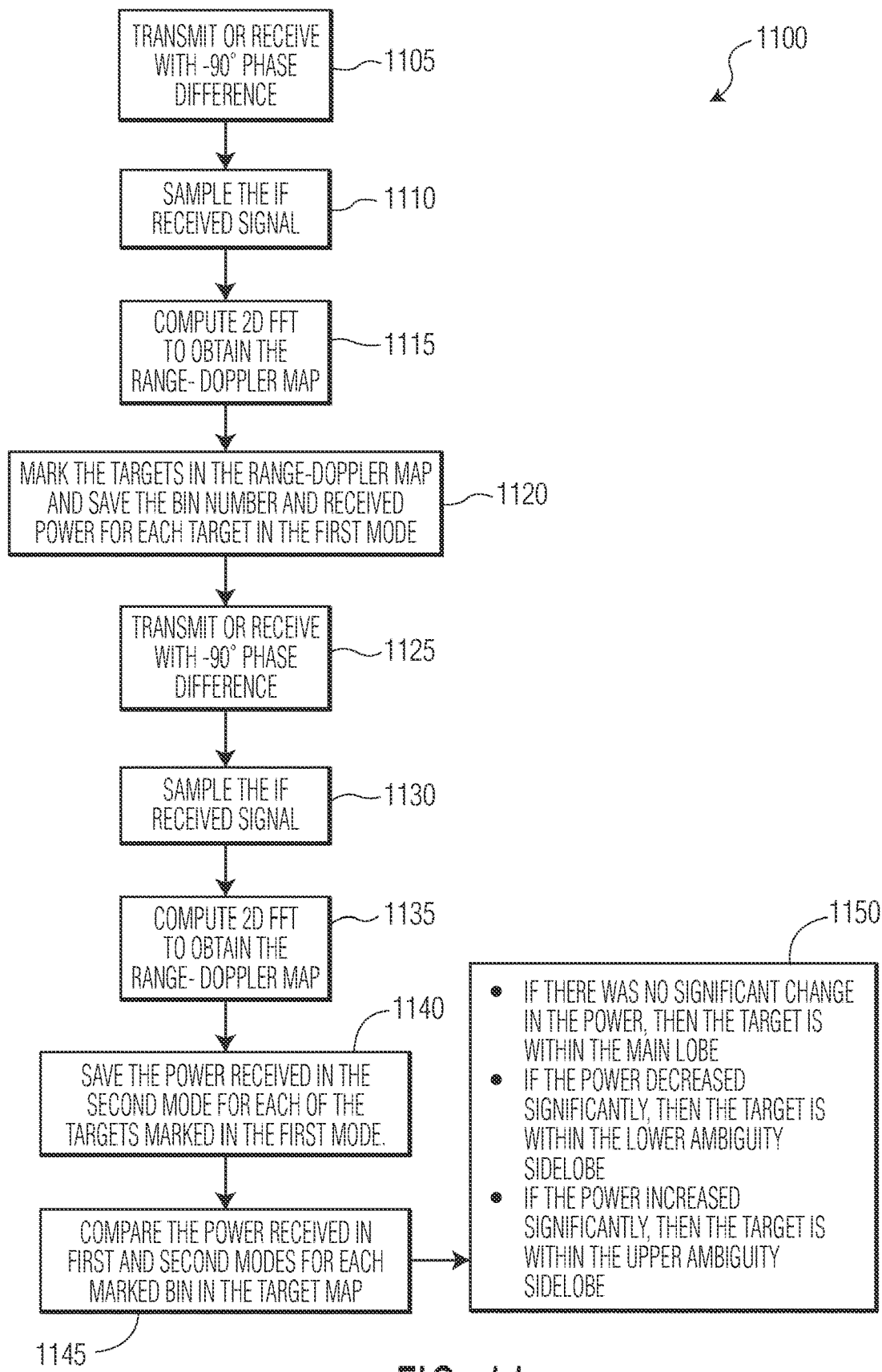
FIG. 11 illustrates a flow diagram of a method carried out by the radar system to remove ambiguities.

FIG. 11 illustrates a flow diagram of a method carried out by the radar system to remove ambiguities. The method 1100 begins by transmitting or receiving a signal with LHCP. As discussed above either the transmit or the receive antenna are circularly polarized based upon the phase difference applied. This may be done using the antennas described in FIG. 1 or 2 or any other reconfigurable polarized antenna. Then the receive or the transmit antenna is a dual polarized antenna like that described in FIG. 3 or any other dual polarized antenna. The radar system then samples the received IF signal 1110. A 2D FFT is performed on the samples of the IF signal in the first mode to produce a range-Doppler map 1115. Other methods may be used to determine the power of the received signal. A detection algorithm detects targets and their bins in the range-Doppler map are saved along with the power for each target 1120. The radar then transmits or receives a signal with RHCP The radar system then samples the received IF signal 1130. A 2D FFT is performed on the samples of the IF signal in the second mode to produce a second range-Doppler map 1135. The radar system then saves the power received in the second mode for each of the targets marked in the first mode 1140. Next, the radar system compares the power received in the first and second modes for each bin marked in the target map 1145. The radar then determines in which lobe each target is found 1150. If there is no significant change in the power, then the target is in the main lobe. If the power decreased significantly, the target is within the lower ambiguity sidelobe. If the power increased significantly, then the target is with in the upper ambiguity sidelobe. Various thresholds may be used to determine if the first and second received power values are significantly equal, have significantly reduced, or significantly increased.

Figure 12:
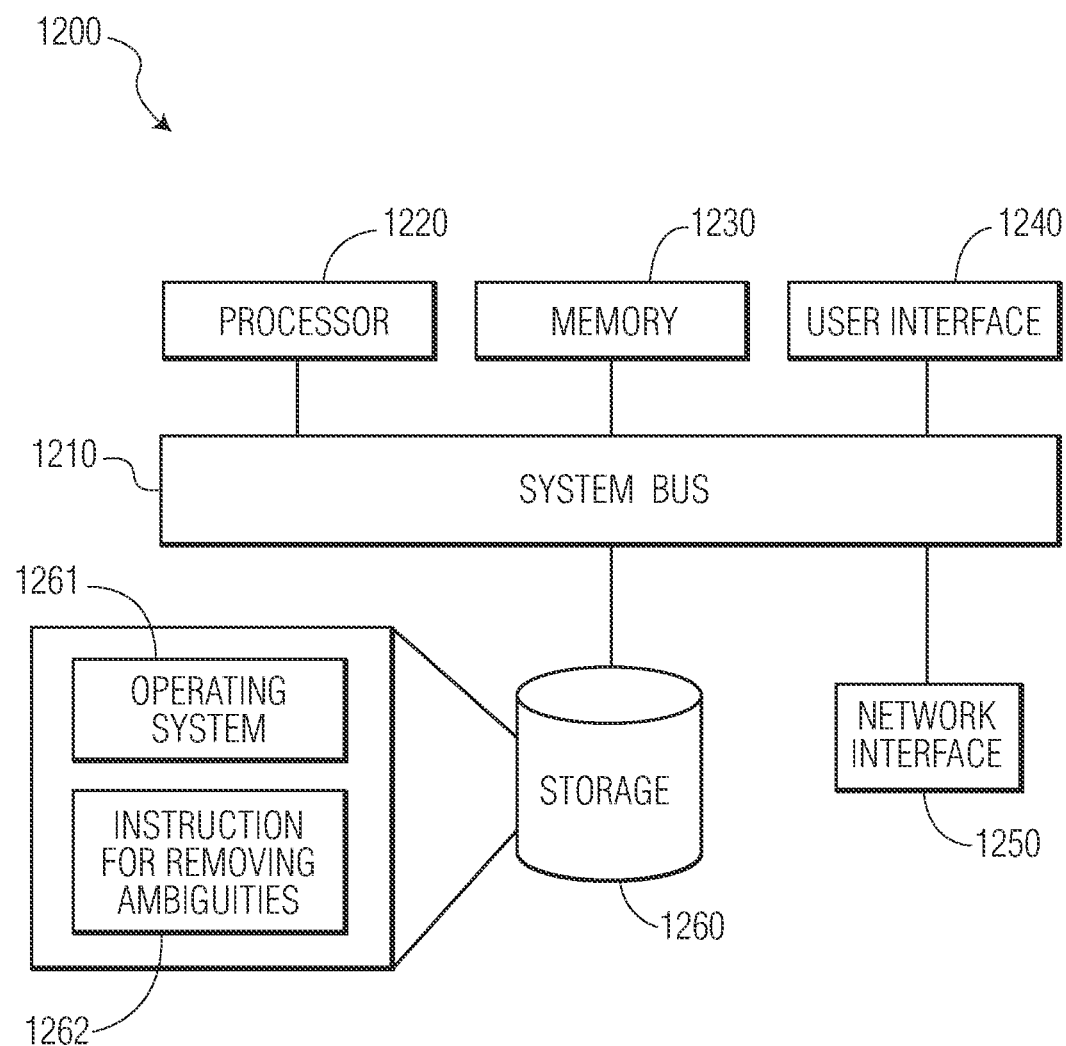
FIG. 12 illustrates an exemplary hardware diagram for implementing the method for removing ambiguities in the radar due to the antenna pattern.

FIG. 12 illustrates an exemplary hardware diagram 1200 for implementing the method for removing ambiguities in the radar due to the antenna pattern. The exemplary hardware 1200 may be a processor associated with the radar system that control the operation of the radar and performs signal processing. As shown, the device 1200 includes a processor 1220, memory 1230, user interface 1240, network interface 1250, and storage 1260 interconnected via one or more system buses 1210. It will be understood that FIG. 12 constitutes, in some respects, an abstraction and that the actual organization of the components of the device 1200 may be more complex than illustrated.

The processor 1220 may be any hardware device capable of executing instructions stored in memory 1230 or storage 1260 or otherwise processing data. As such, the processor may include a microprocessor, microcontroller, graphics processing unit (GPU), neural network processor, field programmable gate array (FPGA), application-specific integrated circuit (ASIC), or other similar devices.

The memory 1230 may include various memories such as, for example L1, L2, or L3 cache or system memory. As such, the memory 1230 may include static random-access memory (SRAM), dynamic RAM (DRAM), flash memory, read only memory (ROM), or other similar memory devices.

The user interface 1240 may include one or more devices for enabling communication with a user. For example, the user interface 1240 may include a display, a touch interface, a mouse, and/or a keyboard for receiving user commands. In some embodiments, the user interface 1240 may include a command line interface or graphical user interface that may be presented to a remote terminal via the network interface 1250.

The network interface 1250 may include one or more devices for enabling communication with other hardware devices. For example, the network interface 1250 may include a network interface card (NIC) configured to communicate according to the Ethernet protocol or other communications protocols, including wireless protocols. Additionally, the network interface 1250 may implement a TCP/IP stack for communication according to the TCP/IP protocols. Various alternative or additional hardware or configurations for the network interface 1250 will be apparent.

The storage 1260 may include one or more machine-readable storage media such as read-only memory (ROM), random-access memory (RAM), magnetic disk storage media, optical storage media, flash-memory devices, or similar storage media. In various embodiments, the storage 1260 may store instructions for execution by the processor 1220 or data upon with the processor 1220 may operate. For example, the storage 1260 may store a base operating system

1261 for controlling various basic operations of the hardware 1200. Storage 1262 may include instructions for carrying out the method for removing ambiguities in the radar due to the antenna pattern.

It will be apparent that various information described as stored in the storage 1260 may be additionally or alternatively stored in the memory 1230. In this respect, the memory 1230 may also be considered to constitute a "storage device" and the storage 1260 may be considered a "memory." Various other arrangements will be apparent. Further, the memory 1230 and storage 1260 may both be considered to be "non-transitory machine-readable media." As used herein, the term "non-transitory" will be understood to exclude transitory signals but to include all forms of storage, including both volatile and non-volatile memories.

The system bus 1210 allows communication between the processor 1220, memory 1230, user interface 1240, storage 1260, and network interface 1250.

While the host device 1200 is shown as including one of each described component, the various components may be duplicated in various embodiments. For example, the processor 1220 may include multiple microprocessors that are configured to independently execute the methods described herein or are configured to perform steps or subroutines of the methods described herein such that the multiple processors cooperate to achieve the functionality described herein.

The following variations from the embodiments described above will now be described. Circular and dual polarization between the transmitting antenna and the receiving antenna are interchangeable. This means that the transmitter can use the dual polarized antenna and the receiver can use the circular polarized antenna. The distance between the closest dual polarized elements can be less than or more than quarter wavelength.

The reconfigurable circular polarization described above use a +90° phase shift, but other approaches to reconfigurable circular polarization may also be used.

The number of elements of the dual polarized antenna may be changed, and the number of elements of the parallel feed arrangement may be increased. The number of elements in the transmitter antenna may be increased to focus the field in the plain perpendicular to that where the ambiguity is to be resolved or the field of view to be shaped.

Other antenna configurations and structures other than the those described above may be used for the generation of reconfigurable circular polarization and dual polarization.

As used herein, the term "non-transitory machine-readable storage medium" will be understood to exclude a transitory propagation signal but to include all forms of volatile and non-volatile memory. When software is implemented on a processor, the combination of software and processor becomes a single specific machine. Although the various embodiments have been described in detail, it should be understood that the invention is capable of other embodiments and its details are capable of modifications in various obvious respects.

Because the data processing implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

Any combination of specific software running on a processor to implement the embodiments of the invention, constitute a specific dedicated machine.

It should be appreciated by those skilled in the art that any block diagrams herein represent conceptual views of illustrative circuitry embodying the principles of the invention.

What is claimed is:

1. A radar system, comprising:
    a transmitter;
    a transmit antenna connected to the transmitter, wherein the transmit antenna is a circular polarized antenna;
    a receiver;
    a receive antenna connected to the receiver, wherein the receive antenna is a dual polarization antenna having a main lobe and an ambiguity sidelobe, wherein the ambiguity sidelobe is one of a lower ambiguity sidelobe, and an upper ambiguity sidelobe;
    a processor;
    a memory storing instruction, that when executed by the processor, cause the radar system at least to:
        transmit a first radar signal with a first circular polarization in a first mode;
        receive a reflected first radar signal;
        process the received reflected first radar signal to detect a target and to produce a first mode target power;
        transmit a second radar signal with a second circular polarization in a second mode;
        receive a reflected second radar signal;
        process the received reflected second radar signal to detect the target and to produce a second mode target power;
        compare the first mode target power to the second mode target power;
        determine that the target is in the main lobe when the first mode target power and the second mode target power are substantially equal;
        determine that the target is in the upper ambiguity sidelobe when a power in the first mode is higher than the power in second mode; and
        determine that the target is in the lower ambiguity sidelobe when the power in the first mode is lower than the power in second mode.

2. The radar system of claim 1, wherein the transmit antenna is a patch antenna with differential feed inputs and a configurable phase shifter configured to shift a phase of one of the differential feed inputs.

3. The radar system of claim 1, wherein the transmit antenna is a configurable circular polarized horn antenna.

4. The radar system of claim 1, wherein the receive antenna is a dual polarized slotted waveguide antenna.

5. The radar system of claim 4, wherein the dual polarized slotted waveguide antenna is a series fed antenna.

6. The radar system of claim 1, wherein the memory further comprises instructions, that when executed by the processor, cause the radar system to:
process the received reflected first radar signal to detect a target and to produce a first mode target power includes processing received intermediate frequency (IF) signal samples of the first radar signal using a two-dimensional fast Fourier transform (2D FFT) to produce a first range-Doppler map; and
process the received reflected second radar signal to detect a target and to produce a second mode target power includes processing received IF signal samples of the second radar signal using a two-dimensional fast Fourier transform (2D FFT) to produce a second range-Doppler map.

7. The radar system of claim 6, wherein comparing the first mode target power to the second mode target power is performed for each target found in the first range-Doppler map and the second range-Doppler map.

8. The radar system of claim 1, wherein the first circular polarization mode is one of a right hand circular polarization and a left hand circular polarization, wherein the second circular polarization is a left hand circular polarization when the first polarization mode is a right hand circular polarization, and wherein the second circular polarization is a right hand circular polarization when the first polarization mode is a left hand circular polarization.

9. The radar system of claim 1, wherein the memory includes instructions to cause the radar system to:
transmit a third radar signal with no circular polarization in a third mode;
receive a reflected third radar signal; and
process the received reflected third radar signal to detect a target and to produce a third mode target power,
wherein the third mode target power is used to verify in which lobe the target is located.

10. A radar system, comprising:
a transmitter;
a transmit antenna connected to the transmitter, wherein the transmit antenna is a dual polarization antenna having a main lobe and an ambiguity sidelobe, wherein the ambiguity sidelobe is one of a lower ambiguity sidelobe, and an upper ambiguity sidelobe;
a receiver;
a receive antenna connected to the receiver, wherein the receive antenna is a reconfigurable circular polarized antenna;
a processor;
a memory storing instruction, that when executed by the processor, cause the radar system at least to:
transmit a first radar signal;
receive a reflected first radar signal with a first circular polarization in a first mode;
process the received reflected first radar signal to detect a target and to produce a first mode target power;
transmit a second radar signal;
receive a reflected second radar signal with a second circular polarization in a second mode;
process the received reflected second radar signal to detect the target and to produce a second mode target power;
comparing the first mode target power to the second mode target power;
determining that the target is in the main lobe when the first mode target power and the second mode target power are substantially equal;
determining that the target is in the upper ambiguity sidelobe when a power in the first mode is higher than the power in second mode; and
determining that the target is in the lower ambiguity sidelobe when the power in the first mode is lower than the power in second mode.

11. The radar system of claim 10, wherein the receive antenna is a patch antenna with differential feed inputs and a configurable phase shifter configured to shift a phase of one of the differential feed inputs.

12. The radar system of claim 10, wherein the receive antenna is a configurable circular polarized horn antenna.

13. The radar system of claim 10, wherein the transmit antenna is a dual polarized slotted waveguide antenna.

14. The radar system of claim 13, wherein the dual polarized slotted waveguide antenna is a series fed antenna.

15. The radar system of claim 10, wherein
processing the received reflected first radar signal to detect a target and to produce a first mode target power includes processing received intermediate frequency (IF) signal samples of the first radar signal using a two-dimensional fast Fourier transform (2D FFT) to produce a first range-Doppler map; and
processing the received reflected second radar signal to detect a target and to produce a second mode target power includes processing received IF signal samples of the second radar signal using a two-dimensional fast Fourier transform (2D FFT) to produce a second range-Doppler map.

16. The radar system of claim 15, wherein comparing the first mode target power to the second mode target power is performed for each target found in the first range-Doppler map and the second range-Doppler map.

17. The radar system of claim 10, wherein the first circular polarization is one of a right hand circular polarization and a left hand circular polarization, wherein the second circular polarization is a left hand circular polarization when the first polarization mode is a right hand circular polarization, and wherein the second circular polarization is a right hand circular polarization when the first polarization mode is a left hand circular polarization.

18. The radar system of claim 10, wherein the memory includes instructions to cause the radar system to:
transmit a third radar signal with no circular polarization in a third mode;
receive a reflected third radar signal; and
process the received reflected third radar signal to detect a target and to produce a third mode target power,
wherein the third mode target power is used to verify in which lobe the target is located.

19. A radar system, comprising:
a transmitter;
a transmit antenna connected to the transmitter, wherein the transmit antenna is a reconfigurable circular polarized antenna;
a receiver;

a receive antenna connected to the receiver, wherein the receive antenna is a dual polarization antenna including alternating horizontal polarization radiating elements and vertical polarization radiating elements configured to receive signals having a main lobe and an ambiguity sidelobe, wherein the ambiguity sidelobe is one of a lower ambiguity sidelobe, and an upper ambiguity sidelobe;

a processor;

a memory storing instruction, that when executed by the processor, cause the radar system at least to:
  transmit a first radar signal with a first circular polarization in a first mode;
  receive a reflected first radar signal;
  determine a first mode target power distribution based on the received reflected first radar signal;
  transmit a second radar signal with a second circular polarization in a second mode; and
  receive a reflected second radar signal;
  determine a second mode target power distribution based on the received reflected second radar signal;
  determine a target in one of the main lobe, the lower ambiguity sidelobe, or the upper ambiguity sidelobe based on a difference between the first mode target power distribution and the second mode target power distribution;
  wherein a field of view of the radar system in the first mode is different from the field of view in the second mode.

20. A radar system, comprising:
a transmitter;
a transmit antenna connected to the transmitter, wherein the transmit antenna is a dual polarization antenna having a radiation pattern including a main lobe and an ambiguity sidelobe, wherein the ambiguity sidelobe is one of a lower ambiguity sidelobe, and an upper ambiguity sidelobe;

a receiver;
a receive antenna connected to the receiver, wherein the receive antenna is a reconfigurable circular polarized antenna;
a processor;
a memory storing instruction, that when executed by the processor, cause the radar system at least to:
  transmit a first radar signal with a first circular polarization in a first mode;
  receive a reflected first radar signal;
  transmit a second radar signal with a second circular polarization in a second mode;
  receive a reflected second radar signal;
  transmit a third radar signal with a third circular polarization in a third mode;
  receive a reflected third radar signal;
  process the first reflected radar signal to determine a first mode target power, the second reflected radar signal to determine a second mode target power, and the third reflected radar signal to determine a third mode target power;
  compare the first mode target power, the second mode target power, and the third mode target power;
  determine a target in the main lobe when a first difference between the first mode target power and the second mode target power is less than a first threshold;
  determine the target in the lower ambiguity sidelobe when a second difference between the first mode target power and the third mode target power is less than a second threshold; and
  determine the target in the upper ambiguity sidelobe when a third difference between the second mode target power and the third mode target power is less than a third threshold.

* * * * *